(12) United States Patent
Kerschbaum et al.

(10) Patent No.: US 9,037,860 B1
(45) Date of Patent: May 19, 2015

(54) AVERAGE-COMPLEXITY IDEAL-SECURITY ORDER-PRESERVING ENCRYPTION

(71) Applicants: Florian Kerschbaum, Karlsruhe (DE); Axel Schroepfer, Rheinstetten (DE); Patrick Grofig, Karlsruhe (DE); Isabelle Hang, Karlsruhe (DE); Martin Haerterich, Wiesloch (DE); Mathias Kohler, Stutensee (DE); Andreas Schaad, Karlsruhe (DE); Walter Tighzert, Heidelberg (DE)

(72) Inventors: Florian Kerschbaum, Karlsruhe (DE); Axel Schroepfer, Rheinstetten (DE); Patrick Grofig, Karlsruhe (DE); Isabelle Hang, Karlsruhe (DE); Martin Haerterich, Wiesloch (DE); Mathias Kohler, Stutensee (DE); Andreas Schaad, Karlsruhe (DE); Walter Tighzert, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/088,123

(22) Filed: Nov. 22, 2013

(51) Int. Cl.
H04L 29/06 (2006.01)

(52) U.S. Cl.
CPC .................................. *H04L 63/0428* (2013.01)

(58) Field of Classification Search
CPC .................................................. H04L 63/0428
USPC ........................................................ 713/168
See application file for complete search history.

(56) References Cited

U.S. PATENT DOCUMENTS

| 2005/0147240 A1* | 7/2005 | Agrawal et al. ............... 380/28 |
| 2005/0147246 A1* | 7/2005 | Agrawal et al. ............... 380/44 |
| 2008/0133935 A1* | 6/2008 | Elovici et al. ................ 713/193 |
| 2008/0183656 A1* | 7/2008 | Perng et al. ...................... 707/2 |
| 2010/0146299 A1* | 6/2010 | Swaminathan et al. ...... 713/189 |
| 2010/0306221 A1* | 12/2010 | Lokam et al. ................. 707/759 |
| 2013/0046995 A1* | 2/2013 | Movshovitz .................. 713/189 |
| 2013/0232341 A1* | 9/2013 | Movshovitz .................. 713/189 |
| 2014/0126718 A1* | 5/2014 | Movshovitz ..................... 380/28 |

FOREIGN PATENT DOCUMENTS

EP 2270684 A1 1/2011

OTHER PUBLICATIONS

R. Agrawal, J. Kiernan, R. Srikant, and Y. Xu. "Order preserving encryption for numeric data." In Proceedings of the ACM International Conference on Management of Data (SIGMOD), 2004.
A. Boldyreva, N. Chenette, Y. Lee, and A. O'Neill. "Order-preserving symmetric encryption." In Advances in Cryptology (EUROCRYPT), 2009.

(Continued)

*Primary Examiner* — Michael S McNally
(74) *Attorney, Agent, or Firm* — Fountainhead Law Group PC

(57) ABSTRACT

Embodiments provide ideal security, order-preserving encryption (OPE) of data of average complexity, thereby allowing processing of the encrypted data (e.g. at a database server in response to received queries). Particular embodiments achieve high encryption efficiency by processing plaintext in the order preserved by an existing compression dictionary already available to a database. Encryption is based upon use of a binary search tree of n nodes, to construct an order-preserving encryption scheme having $\Omega(n)$ complexity and even $O(n)$, in the average case. A probability of computationally intensive updating (which renders conventional OPE impractical for ideal security) is substantially reduced by leveraging the demonstrated tendency of a height of the binary search tree to be tightly centered around $O(\log n)$. An embodiment utilizing such an encryption scheme is described in the context of a column-store, in-memory database architecture comprising n elements. OPE according to embodiments is compatible with adjustable encryption approaches.

20 Claims, 7 Drawing Sheets

(56) References Cited

OTHER PUBLICATIONS

A. Boldyreva, N. Chenette, and A. O'Neill. "Order-preserving encryption revisited: improved security analysis and alternative solutions." In Advances in Cryptology (CRYPTO), 2011.

R. Popa, F. Li, and N. Zeldovich. "An ideal-security protocol for order-preserving encoding." In Proceedings of the 34th IEEE Symposium on Security and Privacy (SP), 2013.

S. Hildenbrand, D. Kossmann, T. Sanamrad, C. Binnig, F. Farber, and J. Woehler, "Query processing on encrypted data in the cloud," Department of Computer Science, ETH Zurich, Tech. Rep. 735, 2011.

R. Popa, C. Redfield, N. Zeldovich, and H. Balakrishnan. "CryptDB: Protecting confidentiality with encrypted query processing." In Proceedings of the 23rd ACM Symposium on Operating Systems Principles (SOSP), 2011.

B. Reed, "The height of a random binary search tree," Journal of the ACM, vol. 50, No. 3, pp. 306-332, 2003.

F. Faerber, N. May, W. Lehner, P. Groe, I. Mueller, H. Rauhe, and J. Dees. "The SAP HANA database—an architecture overview." IEEE Data Engineering Bulletin 35(1), 2012.

M. Stonebraker, D. J. Abadi, A. Batkin, X. Chen, M. Cherniack, M. Ferreira, E. Lau, A. Lin, S. Madden, E. O'Neil, P. O'Neil, A. Rasin, N. Tran, and S. Zdonik, "C-store: a column-oriented dbms," in Proceedings of the 31st International Conference on Very Large Data Bases, ser. VLDB, 2005.

M. Zukowski, P. A. Boncz, N. Nes, and S. Heman, "Monetdb/ x100—a dbms in the cpu cache," IEEE Data Engineering Bulletin, vol. 28, No. 2, pp. 17-22, 2005.

D. Abadi, S. Madden, and M. Ferreira, "Integrating compression and execution in column-oriented database systems," in Proceedings of the 2006 ACM International Conference on Management of Data, ser. SIGMOD, 2006.

C. Binnig, S. Hildenbrand, and F. Faerber, "Dictionary-based order-preserving string compression for main memory column stores," in Proceedings of the 2009 ACM International Conference on Management of Data, ser. SIGMOD, 2009.

M. Zukowski, S. Heman, N. Nes, and P. Boncz, "Super-scalar ram-cpu cache compression," in Proceedings of the 22nd International Conference on Data Engineering, ser. ICDE, 2006.

P. Paillier. "Public-key cryptosystems based on composite degree residuosity classes." In Advances in Cryptology (EUROCRYPT), 1999.

S. Pohlig, and M. Hellman. "An improved algorithm for computing logarithms over GF(p) and its cryptographic significance." IEEE Transactions on Information Theory 24, 1978.

Raluca Ada Popa et al., "An Ideal-Security Protocol for Order-Preserving Encoding," Security and Privacy (SP), 2013 IEEE Symposium, May 19, 2013, pp. 463-477.

Stefan Hildenbrand et al., "Query Processing on Encrypted Data in the Cloud," retrieved from the Internet: http://dx.doi.org/10.3929/ethz-a-007313562. Jan. 1, 2011.

Carsten Binnig et al., "Dictionary-based Order-preserving String Compression for Main Memory Column Stores," Proceedings of the 35th SIGMOD International Conf. on Management of Data, Sigmod'09 Jan. 1, 2009, p. 283-295.

Raluca Ada Popa et al., "CryptDB," Operating Syhstems Principles, ACM, 2 Penn Plaza, Suite 701, New York, NY 10121. Oct. 23, 2011, pp. 85-100.

European Search Report, mailed Feb. 11, 2015, from a corresponding foreign application, EP 14003273.1.

\* cited by examiner

Algorithm 1 Encryption

*Input:* $x_i$
    *Output:* $y_i$
    *State:* $\langle x_{j_1}, y_{j_1} \rangle, \ldots$
    *Initialization:* $\langle -1, -1 \rangle, \langle N, M \rangle$ 1. Find $\langle x_{j_k}, y_{j_k} \rangle$, $\langle x_{j_{k+1}}, y_{j_{k+1}} \rangle$, such that $x_{j_k} \leq x_i < x_{j_{k+1}}$.
2. If $x_{j_k} = x_i$, then return $y_{j_k}$.
3. If $y_{j_{k+1}} - y_{j_k} = 1$, then
      3.1. Initialize to $\langle -1, -1 \rangle, \langle N, M \rangle$.
      3.2. Update with $Update(x_{j_1}, \ldots)$[1](Algorithm 2).
      3.3. Find $\langle x_i, y_i \rangle$[2].
      3.4. Return $y_i$.
4. Compute $$y_i = y_{j_k} + \left\lceil \frac{y_{j_{k+1}} - y_{j_k}}{2} \right\rceil$$

5. Insert $\langle x_i, y_i \rangle$[2].
6. Return $y_i$.

1. Maintain a copy of plaintexts before initializing state.
2. The pair is at position $k + 1$.

FIG. 3A

Algorithm 2 Update

*Input:* Sorted and distinct $x_{j_1}, \ldots, x_{j_i}$
  1. $Encrypt(x_{j_{\lfloor \frac{i}{2} \rfloor + 1}})$.
  2. If $i > 1$, then $Update(x_{j_1}, \ldots, x_{j_{\lfloor \frac{i}{2} \rfloor}})$.
  3. If $i > 2$, then $Update(x_{j_{\lfloor \frac{i}{2} \rfloor + 2}}, \ldots, x_{j_i})$.

Algorithm 3 Decryption

*Input:* $y_i$
  *Output:* $x_i$
  *State:* $\langle x_{j_1}, y_{j_1} \rangle, \ldots$
  1. Find $\langle x_i, y_i \rangle$.
  2. Return $x_i$.

AVERAGE-COMPLEXITY IDEAL-SECURITY ORDER-PRESERVING ENCRYPTION

BACKGROUND

Embodiments relate to encryption, and in particular, to encryption that allows the processing of data in encrypted form.

Unless otherwise indicated herein, the approaches described in this section are not prior art to the claims in this application and are not admitted to be prior art by inclusion in this section.

Order-preserving encryption (OPE) allows many queries (including range queries) to be performed on encrypted data, without requiring modification of the database engine. Such queries may be practical in terms of performance, offering for example, the ability to perform searching of encrypted data present on the cloud.

A number of order-preserving encryption schemes have previously been proposed. Nevertheless, the security of these schemes remains under discussion.

Intuitively, an ideal-security order-preserving encryption offers indistinguishability under ordered chosen plaintext attack (IND-OCPA) scheme, leaking nothing but the order. That is, the ideal encryption of plaintexts $\{7, 12, 19\}$ is $\{1, 2, 3\}$ i.e. exactly their order.

However, such IND-OCPA encryption is difficult to achieve. For example, in the ideal order-preserving encryption above, the ciphertext of 13 and 19 conflict.

The inability to design such an encryption scheme with linear-length ciphertexts, where the encryption scheme is static and stateless, has been demonstrated. Accordingly, some researchers settle for a weaker security notion (random order-preserving function). That security definition, however may leak at least half of the bits.

Another approach modifies construction of the encryption scheme (calling it an encoding scheme). This approach assumes it is not possible to construct an encryption scheme, even if the encryption function can be stateful. This approach then settles for an interactive protocol which updates the encryption on inserts.

While such an approach achieves the goal of ideal-security, it calls for updating the ciphertexts when inserting new values. Such updates are necessary, yet impose a high communication cost because any immutable encryption scheme must have exponential ciphertext size.

Thus, there is a need for systems and methods providing novel approaches for order-preserving encryption.

SUMMARY

Embodiments provide ideal security, order-preserving encryption (OPE) of data of average complexity, thereby allowing processing of the encrypted data (e.g. at a database server in response to received queries). Particular embodiments achieve high encryption efficiency by processing plaintext in the order preserved by an existing compression dictionary already available to a database. Encryption is based upon use of a binary search tree of n nodes, to construct an order-preserving encryption scheme having $\Omega(n)$ complexity and even $O(n)$, in the average case. A probability of computationally intensive updating (which renders conventional OPE impractical for ideal security) is substantially reduced by leveraging the demonstrated tendency of a height of the binary search tree to be tightly centered around $O(\log n)$. An embodiment utilizing such an encryption scheme is described in the context of a column-store, in-memory database architecture comprising n elements. OPE according to embodiments is compatible with adjustable encryption approaches.

An embodiment of a computer-implemented method comprises causing an engine on a client, to create a dictionary copy preserving an order of data stored in a database on a server. The engine is caused to execute an algorithm encrypting the data on the dictionary copy according to the order, and caused to update the data stored in the database according to an update probability. The engine is caused to create further encrypted data from the encrypted data, to send the further encrypted data to the server, and to send a cryptographic key to allow decryption of the further encrypted data.

An embodiment of a non-transitory computer readable storage medium embodies a computer program for performing a method comprising causing an engine on a client, to create a dictionary copy preserving an order of data stored in a database on a server. The engine is caused to execute an algorithm encrypting the data on the dictionary copy according to the order. The engine is caused to update the data stored in the database according to an update probability. The engine is caused to create further encrypted data from the encrypted data, to send the further encrypted data to the server, and to send a cryptographic key to allow decryption of the further encrypted data.

An embodiment of a computer system comprises one or more processors and a software program executable on said computer system. The software program is configured to cause an engine on a client, to create a dictionary copy preserving an order of data stored in a database on a server. The software program is configured to cause the engine to execute an algorithm encrypting the data on the dictionary copy according to the order. The software program is configured to cause the engine to update the data stored in the database according to an update probability. The software program is further configured to cause the engine to create further encrypted data from the encrypted data, to cause the engine to send the further encrypted data to the server, and to cause the engine to send a cryptographic key to allow decryption of the further encrypted data.

In certain embodiments the algorithm comprises constructing a binary search tree comprising n nodes.

According to some embodiments the algorithm further comprises adding a buffer of at least 2 log n bits to the encrypted data to reduce the update probability.

In various embodiments the further encrypted data is created using homomorphic encryption to allow aggregation on the database.

In particular embodiments the further encrypted data is created using deterministic encryption to allow selection on the database.

According to some embodiments the database is in the structured query language (SQL).

In certain embodiments the database comprises a column-store in-memory database.

The following detailed description and accompanying drawings provide a better understanding of the nature and advantages of various embodiments.

BRIEF DESCRIPTION OF THE DRAWINGS

FIG. 3A illustrates an encryption algorithm according to an embodiment.

FIG. 3B illustrates an update procedure referenced in the encryption algorithm of FIG. 3A.

FIG. 3C illustrates a decryption algorithm according to an embodiment.

DETAILED DESCRIPTION

Figure 1:
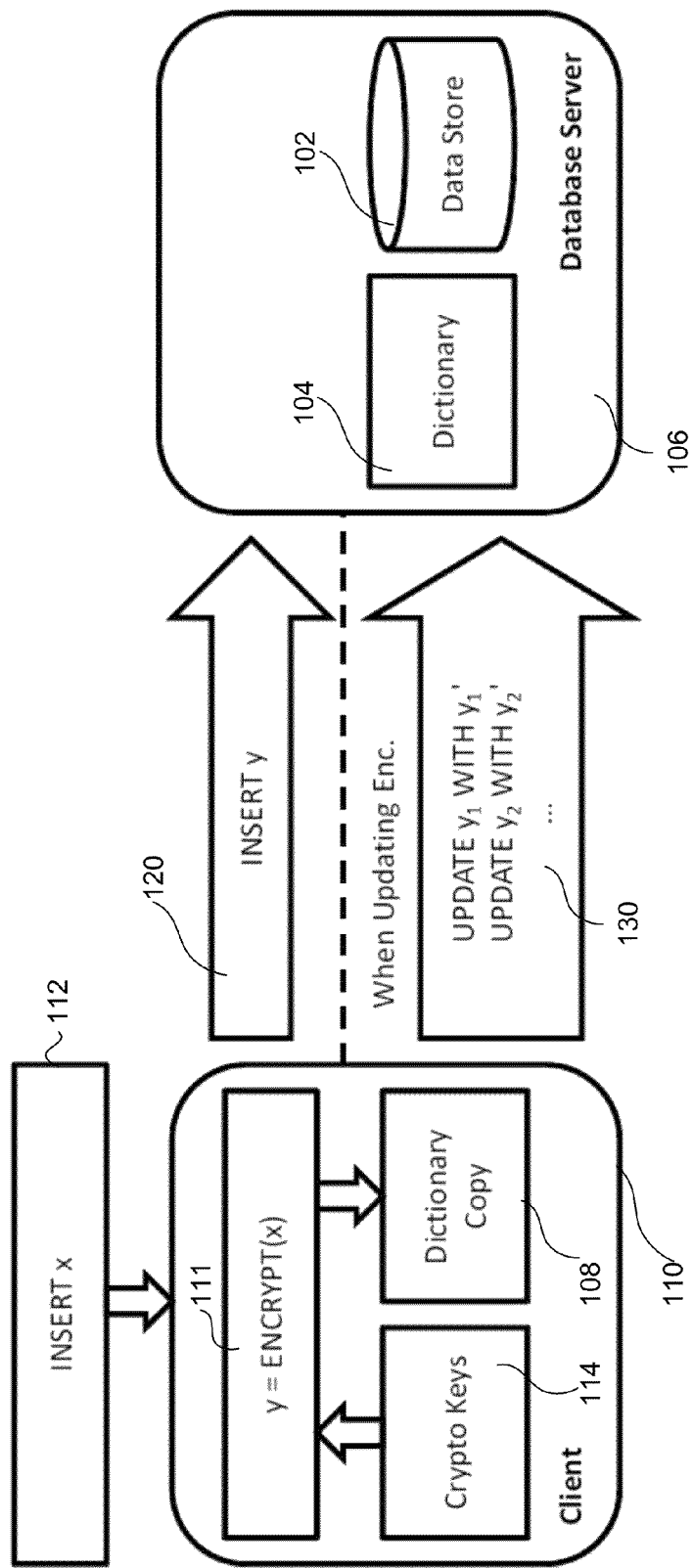
FIG. 1 shows an architecture of client and database integration according to an embodiment.

Described herein are techniques for providing encryption. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

As an initial matter, encryption according to various embodiments may be implemented as part of an encrypted, in-memory, column-store database. Thus, the characteristics of such a database structure are now introduced.

Column-store databases exhibit good performance for analytical workloads. To achieve this, they store the data column-wise, instead of row-wise. All data for a certain column can thus be accessed and processed quickly.

Moreover, the speed of processing can be enhanced further if the data is stored in main memory. A variety of such in-memory database architectures are available, including but not limited to: the HANA database available from SAP AG of Walldorf, Germany; the SYBASE IQ database also available from SAP AG; the Microsoft Embedded SQL for C (ESQL/C) database available from Microsoft Corp. of Redmond, Wash.; and the Exalytics In-Memory database available from Oracle Corp. of Redwood Shores, Calif.

In-memory, column-store databases process the entire column of data for operations, such as a selection. Hence, the speed of transferring data from the main memory to the CPU may comprise a bottleneck.

One optimization to improve speed, is to compress the data. This can significantly improve the processing performance.

A common compression technique is order-preserving dictionary compression. In dictionary compression, data values are replaced by data identifiers. Their relation is stored in a dictionary.

The following shows one example of a dictionary for currency values.

| DATA IDENTIFIER | DATA VALUE (in $) |
|---|---|
| 1 | 0.99 |
| 2 | 1.54 |
| 3 | 9.23 |

A dictionary is order-preserving, if the order relation of the data identifiers is the same as the order relation of the data values. Order-preserving dictionaries offer the benefit that select operations (even for range queries) can be performed without accessing the dictionary. The database operator is fed with the data identifier (or data identifiers for range queries) to select and can then process the column.

However, a SELECT operation that needs to access the dictionary can be costly. This is also true for update or insert operations which may often need to recompute the entire column of data (possibly also implicating further compression operations).

According to embodiments, OPE may recognize that the order-preserving dictionary of a column-store in-memory database, can also offer an ideal-secure order-preserving encryption. In particular, given that the in-memory database already performs this dictionary operation automatically (although not as encryption operation), embodiments may leverage this activity in designing an encrypted database that integrates with the existing dictionary.

One conventional approach to achieving this goal, could be to strip the dictionary of the data values, and keeping those at the client instead. This achieves ideal-security for the order-preserving encryption, since the database only learns the data identifiers. However, this undesirably prevents operations from occurring at the server (e.g. on the cloud in a Data-as-a-Service DaaS configuration) that would require access to the data values (such the aggregation operation commonly used in analytical workloads).

An alternative conventional approach could be to encrypt the data values in the dictionary. This alternative conventional approach also achieves ideal-security on the database. But, it imparts O(n log n) cost for inserting n number of database elements. This is because each element needs to be sorted into the dictionary.

A disadvantage shared by both of these conventional approaches, is that the database needs to be encrypted in OPE.

Under the concept of adjustable encryption, encryption may be layered from order-preserving on the innermost layer, over deterministic encryption to randomized encryption on the outermost layer. In such adjustable encryption schemes, depending on the operation performed one or more layers of encryption may be removed before executing the operator. This results in significantly better security, since only a subset of columns needs to be encrypted order-preserving.

According to embodiments, ideal security, order-preserving encryption (OPE) of data of average complexity is provided, thereby allowing processing of the encrypted data (e.g. at a database server in response to received queries). Particular embodiments achieve high encryption efficiency by processing plaintext in the order preserved by an existing compression dictionary already available to a database. Encryption is based upon use of a binary search tree of n nodes, to construct an order-preserving encryption scheme having $\Omega(n)$ complexity and even $O(n)$, in the average case. A probability of computationally intensive updating (which renders conventional OPE impractical for ideal security) is substantially reduced by leveraging the demonstrated tendency of a height of the binary search tree to be tightly centered around $O(\log n)$. An embodiment utilizing such an encryption scheme is described in the context of a column-store, in-memory database architecture comprising n elements. OPE according to embodiments is compatible with adjustable encryption approaches.

Embodiments of OPE schemes as described herein, may smoothly integrate with adjustable encryption approaches mentioned above. Thus, the order-preserving encryption may typically be the innermost layer of an onion of encryption.

Embodiments may thus result in encryption being performed (mostly) at the client. This is because since other layers of encryption may be applied.

Figure 2:
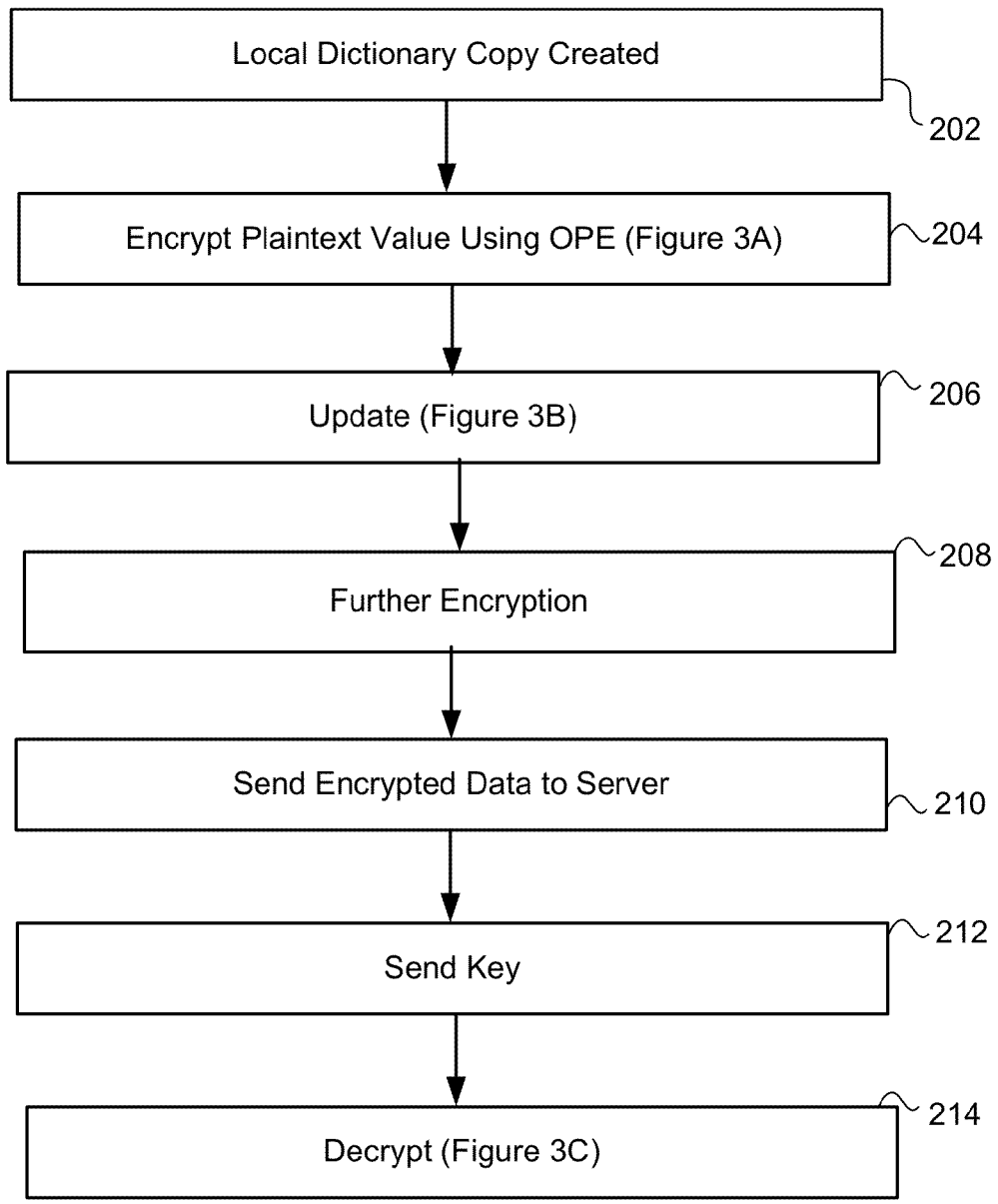
FIG. 2 is a simplified flow diagram showing a process according to an embodiment.

A specific OPE encryption scheme according to particular embodiments, is now described in connection with FIGS. 1 and 2. In particular, FIG. 1 shows an embodiment of architecture 100 of client and database integration. FIG. 2 shows a simplified flow diagram illustrating steps of a process 200 according to an embodiment.

FIG. 1 shows a client-server architecture 100, wherein data store 102 and order preserving dictionary 104 are present on the database server 106. In a first step 202, a dictionary copy 108 comprising the plaintext values is created on the client 110 by an engine 111.

In a second step 204, plaintext x is encrypted utilizing the ideal security OPE according to an algorithm ENCRYPT. In particular, FIG. 1 shows insertion of plaintext x 112 to the client, followed by encryption thereon using cryptographic keys 114 to create encrypted data y 116, stored as a dictionary copy. This encryption occurs according to the same order preserved by the dictionary copy. Details regarding a specific encryption algorithm are provided below in connection with FIG. 3A.

The order-preserving encryption scheme according to embodiments is mutable. Thus, it may be necessary to update all ciphertexts, as shown in 130 of FIG. 1 and step 206 of FIG. 2. In the event that the encryption algorithm triggers such an update, a second algorithm (e.g. as shown in FIG. 3B), re-encrypts the entire local dictionary. As discussed herein, however, owing to the inherent characteristics of data of average complexity, it is expected that such updates will infrequently be needed.

Encryption to the topmost layer currently stored in the database, is performed. Then, update commands are issued to replace all current dictionary values with their new ciphertexts.

As such an update operation may be costly, its occurrence is desired to be kept to a minimum. A detailed discussion of achieving this goal, both theoretically and practically, is provided later below in connection with performance evaluation.

In step 208, the ciphertext is encrypted further by the engine using a proxy-reencryptable deterministic (DET) encryption scheme. Finally, this ciphertext is encrypted using a standard randomized (RND) encryption algorithm. One example can be the Advanced Encryption Standard (AES) in counter mode.

As shown in step 120 of FIG. 1 and step 210 of FIG. 2, the encrypted data is then sent by the engine to the server on which the database resides. Thus before inserting (or updating) a database row, each value is encrypted.

For database integration, encryption is performed at the SQL layer, and does not interfere with the dictionary of the in-memory, column-store database. Instead, a local copy is maintained at the client, and updates are performed using the SQL update command.

The final ciphertext is sent as the data value in the insert or update commands to the database. A local copy of the dictionary is maintained on the client with the corresponding plaintext values.

A separate copy may be sent in homomorphic encryption. With a SELECT operation requiring either deterministic (DET) or order-preserving encryption (OPE), in step 212 the corresponding key is sent to the database which decrypts using a stored procedure (shown in FIG. 3C). That decryption is permanent, and not restored.

The overall design shown in FIG. 1 allows operating the encrypted database on the SQL layer. That is, the dictionary on the server is not interfered with. Instead, the data values are modified on the client, and standard SQL commands are used.

Furthermore, embodiments readily allow the application of onion encryption (e.g. in multiple successive layers) on the client, and the database is often encrypted on higher layers than order-preserving encryption.

A specific OPE encryption algorithm is now illustrated in connection with FIG. 3A, and discussed in detail later below. FIG. 3A shows the encryption of plaintext $x_i$ in the order preserved by the dictionary ($x_{-1}$ to $x_N$) to produce corresponding ciphertext $y_i$ whose order is preserved—i.e. ($y_{-1}$ to $y_M$)

The encryption algorithm of FIG. 3A also shows an update (step 3.2), which involves the steps in the Algorithm 2 illustrated FIG. 3B. Given the tendency of the height of a random binary search tree to be tightly centered around O(log n), with n being a number of elements in a database, it is expected that the need for such a computationally intensive update step in cases of average complexity data, will be infrequent.

Figure 4A:
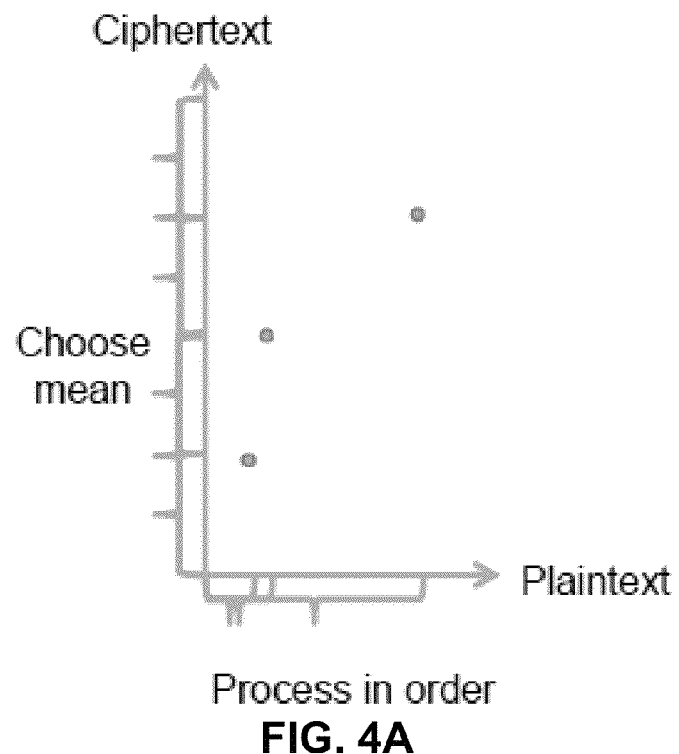
FIG. 4A is a simplified schematic view illustrating ideal-security order-preserving encryption according to an embodiment.

FIG. 4A is a simplified schematic view illustrating ideal-security order-preserving encryption according to an embodiment. FIG. 4A shows the efficient processing of the plaintext (in the same order preserved by the existing dictionary), resulting in the corresponding ciphertext representing a mean (i.e., an even distribution of points along the Y-axis).

Figure 4B:
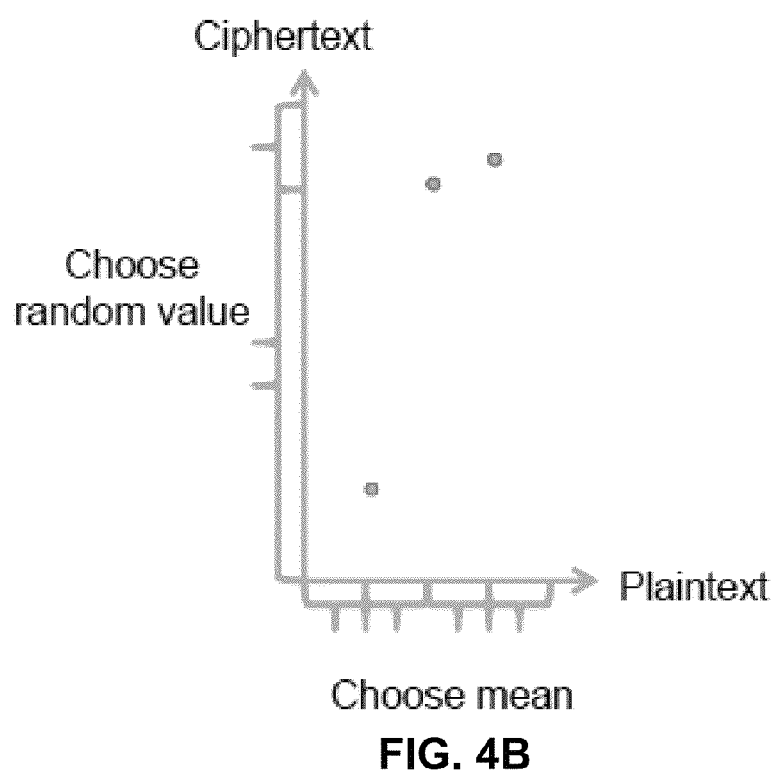
FIG. 4B is a simplified schematic view illustrating conventional order-preserving encryption exhibiting less security.

By contrast, FIG. 4B is a simplified schematic view illustrating a conventional approach to implementing order-preserving encryption. By processing the plaintext according to a mean (rather than in order), the conventional encryption scheme of FIG. 4B would be expected to result in the corresponding ciphertext representing a randomly chosen value (i.e. an uneven distribution of points along the Y-axis). The inefficiency cost incurred by such a conventional approach, renders it impractical to implement the ideal-security OPE achievable according to embodiments as described herein.

Example

An example is now present in connection with a specific encryption, update, and decryption algorithms presented in FIGS. 3A-3B.

Let $x_1, \ldots, x_i, \ldots, x_n$ be the sequence of plaintexts inserted, such that $0 \leq x_i < N$. Let $y_1, \ldots, y_i, \ldots, y_n$ be the corresponding ciphertexts, such that $0 \leq y_i < M$. A description of how to choose M is provided later below. Note the ciphertexts $y_i$ may be modified during the process of encryption. Let $x_{j_1}, \ldots, x_{j_m}$ and $y_{j_1}, \ldots, y_{j_m}$ be the ordered sequence of distinct plaintexts and ciphertexts, respectively.

Consider the following example: N=16 and M=256. Let n=3, $x_1$=13, $x_2$=5 and $x_3$=7. Then m=3, $y_1$=128, $y_2$=64 and $y_3$=96 (without necessity for any ciphertext modification). For the ordered sequence we have $j_1$=2, $j_2$=3 and $j_3$=1, i.e., $x_{j_1}$=5, $y_{j_1}$=64, and so on.

The input to the encryption algorithm (Algorithm 1 of FIG. 3A) is a plaintext $x_i$. Encryption is stateful and stores an ordered list of plaintext-ciphertext pairs $\langle x_i, y_i \rangle$. This list is initialized to $\langle -1, -1 \rangle, \langle N, M \rangle$. The output of the encryption, i.e. the ciphertext $y_i$, is sent to the database server.

The update algorithm (Algorithm 2 of FIG. 3B) potentially updates all ciphertexts produced so far. It re-encrypts all (distinct) plaintexts in order, i.e. the median element first and so on. Thus, it produces a (temporarily) balanced tree.

The state of the encryption algorithm is updated on the database client. This updated state is sent to the database server and its persistent data is updated—potentially all database rows. This affects not only the column store, but also the entire dictionary.

The decryption algorithm (Algorithm 3 of FIG. 3C) is simple lookup in the state.

Security, and in particular the idea security achieved according to embodiments, is now discussed. Proof of the IND-OCPA secure status of the encryption scheme, despite its update algorithm, is now provided. This implies the update operation does not impact security.

Specifically, the following security game is defined between an encryptor E and an adversary Adv based on the IND-OCPA definition allowing for update operations.

1) The encryptor E chooses a random bit b.
2) The encryptor E and the adversary Adv engage in a polynomial number of rounds in which the adversary may be adaptive. At round i:
a) The adversary Adv sends values $x_i^0$, $x_i^1$ ($0 \leq x_i^{[0,1]} < N$) to the encryptor E.
b) The encryptor E returns Encrypt($x_i^b$). If the encryptor E invokes Update($x_{j_1}, \ldots, x_{j_i}$), then the adversary may observe the updated list $y_{j_1}, \ldots, y_{j_i}$.
3) The adversary Adv outputs b', its guess for b.

The adversary Adv wins the game if its guess is correct (b=b') and the sequences $x_1^0, \ldots$ and $x_1^1, \ldots$ have the same order relation (i.e., for all i, j: $v_i^0 < v_j^0 \Leftrightarrow v_i^1 < v_j^1$). Let $win_{Adv}$ be the random variable indicating the success of the adversary in the above game.

Definition 1: an OPE scheme is (perfectly) IND-OCPA secure if for all p.p.t. adversaries Adv Pr[$win_{Adv}$]=½.

Theorem 2: the OPE scheme according to embodiments is (perfectly) IND-OCPA secure.

Proof: observe that the encryption algorithm (Algorithm 1 of FIG. 3A) will start with the same initial state independent of b. The following lemma is now stated.

Lemma 3: if the sequences of $x_1^b, \ldots$ have the same order relation, the state of the encryption will contain the same $y_{j_1}, \ldots$ independent of b.

Proof: this is proven by induction. Assume it holds for round i. Then since the sequences have the same order relation, the algorithm will find pairs with the same $y_{j_k}$, $y_{j_{k+1}}$ in step 1 due to the induction assumption.

Step 2 is a check within one of the two sequences $x_1^b, \ldots$ and since they have the same order relation, the condition will evaluate the same in both cases. Then, due to the induction assumption the return value $y_{j_k}$ will be the same independent of b.

Updates are triggered in step 3 of Algorithm 1. Clearly, the choice is only made by the values of $y_{j_k}$, $y_{j_{k+1}}$. Due to the induction assumption the choice is therefore independent of b.

Then the computation also leads to same $y_i$ in step 4. The state is therefore updated with an $x_i$ of the same order relation and the same $y_i$. Hence, the induction holds for i+1.

Clearly, Lemma 3 holds for i=0, since it starts with the same initial state.

In summary, the encryption algorithm outputs the same values $y_i$ and performs the same update operations in both cases of b. Therefore, any adversary Adv can at best guess the value b'.

Insertion order is now discussed. As shown the OPE scheme is ideal secure, but it does leak additional information to the order. Namely, when observing the encryption at the database, i.e. the values $y_i$, one can determine a partial order of insertion. Encryption schemes according to embodiments form a binary search tree. The lowest bit set in the ciphertext marks the height in tree (if M is a power of 2). The lower the height, the later the element has been inserted. Of course, the adversary cannot determine the insertion order between elements of the same height. Therefore it remains a partial order.

First, this leakage is not considered to be problematic in the use with encrypted databases. Determining the time of compromise in an encrypted database is excruciatingly difficult and therefore the worst-case that the database is always compromised is assumed. Under this worst-case assumption, the adversary obtains the insertion order anyway—even in case of a same-time indistinguishability definition.

Second, the IND-OCPA definition cannot account for the insertion order, since—as in any other chosen plaintext attack—the adversary controls this insertion order. It is therefore known to the adversary. Hence, it is not surprising that embodiments still can fulfill this strict security definition.

Domain coverage is now discussed. The security of order preserving encryption relies on the assumption that the plaintext values only sparsely populate their domain. If all values in a domain are encrypted, order-preserving encryption is completely insecure—even if ideal secure. The ideal secure order-preserving encryption of the values from 1 to n is 1 to n, i.e. plaintexts and ciphertexts are identical. While not yet quantified, this observation may be kept in mind when using order-preserving encryption.

Clearly, this assumption is violated when encrypting auto-increment counters. The order-preserving encryption of an auto-increment counter—often used as identifiers and foreign keys in databases—is the counter itself. It therefore should not be order-preserving encrypted at all.

This also alleviates the problem that auto-increment counters incur the maximum encryption cost according to embodiments. They result in the maximum number of update operations possible, since they follow the worst-case schedule of encryptions. Yet, since they are not to be encrypted at all (for security reasons), they do not represent a problem (for performance reasons).

Performance is now discussed. A theoretical analysis considers the best case, the average case and the worst case complexity of an algorithm according to an embodiment. For the average case, a uniform distribution of the input is assumed.

First, a cost model for the algorithms is defined. Local operations on the client can be implemented efficiently—even for large plaintext sets —, since there are no complex (cryptographic) computations (such as modular exponentiations or bilinear maps). Instead all computations are simple arithmetic and simple data structure lookups. As discussed above, update operations on the database are costly. Therefore, the cost of inserting one element into the database is mainly considered. Since delay in communication is the main cost, the number of rounds of interaction between the database server and the client is counted as the cost of one insertion.

Second, the complexity of the basic algorithms is determined. If encryption proceeds without update, then only the new ciphertext is needed to be sent to the database: cost O(1): that is, Algorithm 1 has cost O(1) if steps 3.1 to 3.4 are not executed. A single update operation has cost O(n), since all elements so far are to be updated: that is, Algorithm 2 has cost O(n). Probability of an update is now determined in the best case, average case, and worst case.

Theorem 4: in the best case algorithm embodiments incur cost O(n) in communication with the database server. This is also the theoretical lower bound.

Proof: the best case is when all elements of a perfectly balanced binary search tree are inserted in pre-order traversal. In this best case, no update is ever needed, since the result is also a perfectly balanced binary search tree. Hence, for n elements cost nO(1)=O(n). This is also the lower bound, because each of the n elements is sent at least once.

The worst case is also easy to analyze.

Theorem 5: in the worst case algorithm embodiments incur cost $O(n^2/\log n)$ in communication with the database server.

Proof: as already pointed out above, the worst case adversarial schedule of plaintext inputs results in an update operation roughly all $O(\log M)$ elements. As shown later below, $M=O(n)$ is chosen such that $M>2N$. That is, there is always at least $\log N$ ciphertext space to be filled before an update operation. Therefore the worst case cost is:

$$n/O(\log n) \cdot O(n) = O(n^2/\log n).$$

Theorem 6: if the ciphertext domain $M>2^\lambda N$, then in the average case under uniform input distribution our algorithms incur cost $O(n)$ in communication with the database server.

Proof: for analyzing the average case complexity, it is again noted that the height of a random binary search tree is tightly centered around $O(\log n)$. According to embodiments, the ciphertexts are from a binary search tree. The first plaintext element inserted is the root (the center ciphertext). Subsequent plaintext are placed to the left or right depending on their order relation.

Theorem 7: let $H_n$ be the height of a random binary search tree of n nodes. Then, $E[H_n]=4.31107\ldots \ln n-1,95302\ldots \ln \ln n+O(1)$ and $\text{Var}[H_n]=O(1)$.

Note that the maximum length of a ciphertext directly corresponds to the height of the tree. This implies for encryption schemes according to embodiments, on average a ciphertext space $O(\log n)$ will be sufficient. Furthermore, since the variance is constant, it will be sufficient with high probability.

Accordingly, embodiments use a value of $M=O(n)$. Furthermore, the probability $\Pr[\text{Upd}]$ is reduced. The average complexity for all insertions is $n(1+\Pr[\text{Upd}]O(n))$. For $\Pr[\text{Upd}]\leq O(1/n)$, $O(n)$ overall average complexity is achieved.

Lemma 8: let $X_{n,h}$ be the (random) set of nodes at depth h. Then, there is a (universal) constant $C_2>2$ such that, for $i>0$, we have $\Pr[X_{n,E[H_n]+i}\neq \emptyset]<C_2 2^{i/2}$.

This means that the probability of encountering a ciphertext with length longer than the expected value, decreases exponentially with the length of the ciphertext. Hence, if a buffer of at least $2 \log n$ bits is added to the ciphertext length, then the probability of exceeding that buffer is at most $O(1/n)$. This accomplishes the probability of an update $\Pr[\text{Upd}]\leq O(1/n)$.

In summary, for a plaintext space of $N=2^l$, a ciphertext space of $\lambda l$ bits, i.e. $M=2^{\lambda l}$ is recommended. The expected average case complexity of inserting n elements is then $O(n)$. Clearly, $\lambda \geq 4.31107+2$, but the choice of $\lambda$ can also be evaluated in experiments.

Figure 5:
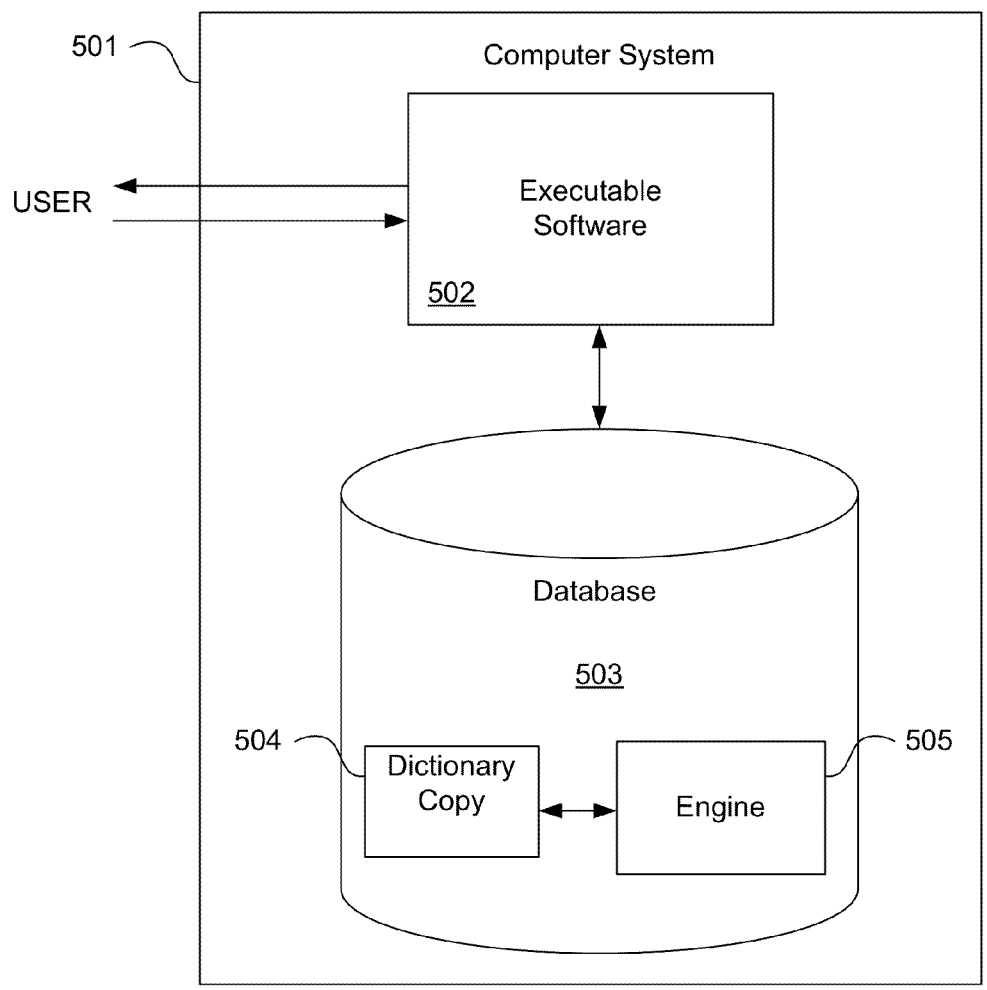
FIG. 5 illustrates hardware of a special purpose computing machine configured to implement encryption according to an embodiment.

FIG. 5 illustrates hardware of a special purpose computing machine configured to implement encryption according to an embodiment. In particular, computer system 501 comprises a processor 502 that is in electronic communication with a non-transitory computer-readable storage medium 503. This computer-readable storage medium has stored thereon code 504 corresponding to a dictionary copy. Code 505 corresponds to an engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 6:
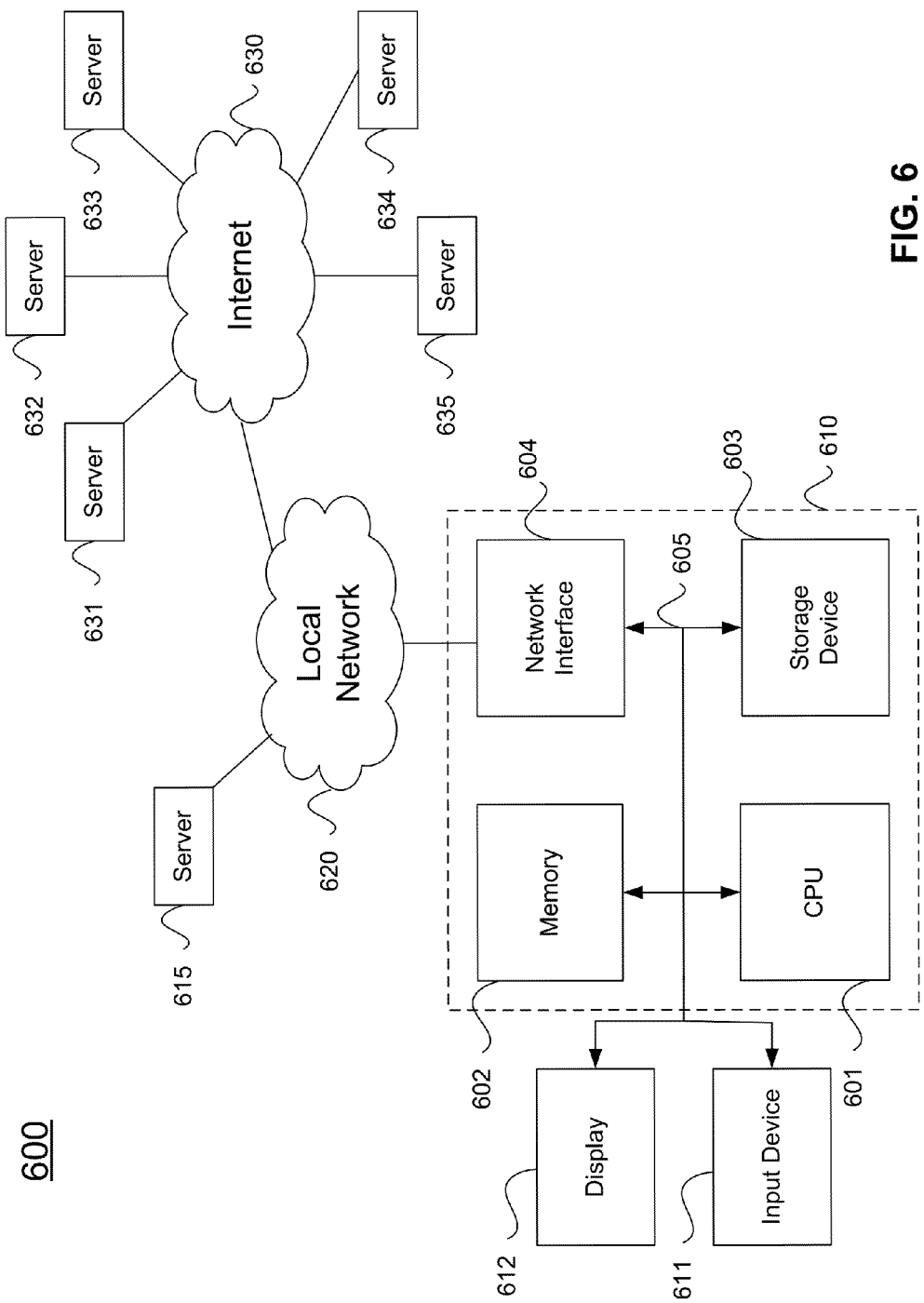
FIG. 6 illustrates an example of a computer system.

An example system 600 for implementing encryption, is illustrated in FIG. 6. Computer system 610 includes a bus 605 or other communication mechanism for communicating information, and a processor 601 coupled with bus 605 for processing information. Computer system 610 also includes a memory 602 coupled to bus 405 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 610 may communicate with a plurality of other computer machines, such as server 615. Accordingly, computer system 610 and server computer systems represented by server 615 may form a cloud computing network, which may be programmed with processes described herein. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

The above description illustrates various embodiments along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
   causing an engine on a client, to create a dictionary copy preserving an order of data stored in a database on a server;
   causing the engine to execute an algorithm encrypting the data on the dictionary copy according to the order;
   causing the engine to update the data stored in the database according to an update probability;
   causing the engine to create further encrypted data from the encrypted data;
   causing the engine to send the further encrypted data to the server; and
   causing the engine to send a cryptographic key to allow decryption of the further encrypted data.

2. The computer-implemented method of claim 1 wherein the algorithm comprises constructing a binary search tree comprising n nodes.

3. The computer-implemented method of claim 2 wherein the algorithm further comprises adding a buffer of at least 2 log n bits to the encrypted data to reduce the update probability.

4. The computer-implemented method of claim 1 wherein the further encrypted data is created using homomorphic encryption to allow aggregation on the database.

5. The computer-implemented method of claim 1 wherein the further encrypted data is created using deterministic encryption to allow selection on the database.

6. The computer-implemented method of claim 1 wherein the database is in the structured query language (SQL).

7. The computer-implemented method of claim 1 wherein the database comprises a column-store in-memory database.

8. A non-transitory computer readable storage medium embodying a computer program for performing a method, said method comprising:
   causing an engine on a client, to create a dictionary copy preserving an order of data stored in a database on a server;
   causing the engine to execute an algorithm encrypting the data on the dictionary copy according to the order;
   causing the engine to update the data stored in the database according to an update probability;
   causing the engine to create further encrypted data from the encrypted data;
   causing the engine to send the further encrypted data to the server; and
   causing the engine to send a cryptographic key to allow decryption of the further encrypted data.

9. A non-transitory computer readable storage medium as in claim 8 wherein the algorithm comprises constructing a binary search tree comprising n nodes.

10. A non-transitory computer readable storage medium as in claim 9 wherein the algorithm further comprises adding a buffer of at least 2 log n bits to the encrypted data to reduce the update probability.

11. A non-transitory computer readable storage medium as in claim 8 wherein the further encrypted data is created using homomorphic encryption to allow aggregation on the database.

12. A non-transitory computer readable storage medium as in claim 8 wherein the further encrypted data is created using deterministic encryption to allow selection on the database.

13. A non-transitory computer readable storage medium as in claim 8 wherein the database is in the structured query language (SQL).

14. A non-transitory computer readable storage medium as in claim 8 wherein the database comprises a column-store in-memory database.

15. A computer system comprising:
   one or more processors;
   a software program, executable on said computer system, the software program configured to:
   cause an engine on a client, to create a dictionary copy preserving an order of data stored in a database on a server;
   cause the engine to execute an algorithm encrypting the data on the dictionary copy according to the order;
   cause the engine to update the data stored in the database according to an update probability;
   cause the engine to create further encrypted data from the encrypted data;
   cause the engine to send the further encrypted data to the server; and
   cause the engine to send a cryptographic key to allow decryption of the further encrypted data.

16. A computer system as in claim 15 wherein the algorithm comprises constructing a binary search tree comprising n nodes.

17. A computer system as in claim 16 wherein the algorithm further comprises adding a buffer of at least 2 log n bits to the encrypted data to reduce the update probability.

18. A computer system as in claim 15 wherein the further encrypted data is created using homomorphic encryption to allow aggregation on the database.

19. A computer system as in claim 15 wherein the further encrypted data is created using deterministic encryption to allow selection on the database.

20. A computer system as in claim 15 wherein the database comprises a column-store in-memory database.

* * * * *